US012686812B2

(12) United States Patent
Liu et al.

(10) Patent No.:  US 12,686,812 B2
(45) Date of Patent:       Jul. 21, 2026

(54) COMPOSITE ELECTROCHROMIC MATERIAL, AND PREPARATION METHOD THEREFOR AND APPLICATION THEREOF

(71) Applicants:NANTONG TEXTILE & SILK IND TECH RES INST, Jiangsu (CN); SOOCHOW UNIVERSITY, Jiangsu (CN)

(72) Inventors: Yuqing Liu, Jiangsu (CN); Qin Li, Jiangsu (CN); Jian Fang, Jiangsu (CN)

(73) Assignees: NANTONG TEXTILE & SILK IND TECH RES INST, Jiangsu (CN); SOOCHOW UNIVERSITY, Jiangsu (CN)

( * ) Notice: Subject to any disclaimer, the term of this patent is extended or adjusted under 35 U.S.C. 154(b) by 368 days.

(21) Appl. No.: 18/282,375

(22) PCT Filed: Mar. 15, 2022

(86) PCT No.: PCT/CN2022/080835
§ 371 (c)(1),
(2) Date: Sep. 15, 2023

(87) PCT Pub. No.: WO2022/194125
PCT Pub. Date: Sep. 22, 2022

(65) Prior Publication Data
US 2025/0026978 A1      Jan. 23, 2025

(30) Foreign Application Priority Data

Mar. 16, 2021    (CN) .......................... 202110279348.9

(51) Int. Cl.
*C09K 9/02*          (2006.01)
*C01B 32/174*        (2017.01)
(Continued)

(52) U.S. Cl.
CPC .............. *C09K 9/02* (2013.01); *C01B 32/174* (2017.08); *D01D 5/08* (2013.01); *D01D 5/24* (2013.01);
(Continued)

(58) Field of Classification Search
CPC .............. C09K 9/02; C09K 2211/1425; C09K 2211/1433; C01B 32/174; C01B 2202/06;
(Continued)

(56) References Cited

U.S. PATENT DOCUMENTS

2010/0220074 A1*   9/2010  Irvin, Jr. ................. G06F 3/045
                                                                345/174
2019/0145161 A1*   5/2019  Agrawal ................... E06B 9/24
                                                                359/275

FOREIGN PATENT DOCUMENTS

CN         103952795        7/2014
CN         104250859        12/2014
          (Continued)

OTHER PUBLICATIONS

International Search Report and Written Opinion for PCT/CN2022/080835 dated Jun. 17, 2022.
First Office Action for CN 202110279348.9 dated Aug. 12, 2022.

*Primary Examiner* — Matthew D Matzek
(74) *Attorney, Agent, or Firm* — Barnes & Thornburg LLP

(57)          ABSTRACT
A composite electrochromic material, a preparation method therefor and an application thereof, the material comprising a core layer, a skin layer having an electrochromic function, and a light-transmitting protective layer formed by a flexible polymer material, that are arranged in sequence. The material of the core layer comprises a fluid conductive mixture, which comprises liquid metal and carboxylated carbon nanotubes. The preparation method comprises: carrying out spinning by co-extrusion using a three-channel nozzle to
(Continued)

form hollow double-layer fibers each having a skin layer and a protective layer as well as a cavity, injecting the conductive mixture into the cavity of the hollow double-layer fiber. The material has excellent deformation ability, stable and sensitive color changing function, and a controllable deformation degree. The material has a stable color changing function even in the case of severe deformation, good fatigue resistance, and is suitable for the preparation of intelligent textiles.

17 Claims, 1 Drawing Sheet

(51) Int. Cl.

| | |
|---|---|
| *D01D 5/08* | (2006.01) |
| *D01D 5/24* | (2006.01) |
| *D01D 5/34* | (2006.01) |
| *D01F 8/06* | (2006.01) |
| *D01F 8/10* | (2006.01) |
| *D01F 8/16* | (2006.01) |
| *D01F 8/18* | (2006.01) |
| *D06M 11/74* | (2006.01) |
| *D06M 11/83* | (2006.01) |
| *B82Y 30/00* | (2011.01) |
| *D06M 101/20* | (2006.01) |
| *D06M 101/24* | (2006.01) |
| *D06M 101/30* | (2006.01) |

(52) U.S. Cl.
CPC ................ *D01D 5/34* (2013.01); *D01F 8/06* (2013.01); *D01F 8/10* (2013.01); *D01F 8/16* (2013.01); *D01F 8/18* (2013.01); *D06M 11/74* (2013.01); *D06M 11/83* (2013.01); *B82Y 30/00* (2013.01); *C01B 2202/06* (2013.01); *C01B 2202/34* (2013.01); *C01B 2202/36* (2013.01); *C09K 2211/1425* (2013.01); *C09K 2211/1433* (2013.01); *D06M 2101/20* (2013.01); *D06M 2101/24* (2013.01); *D06M 2101/30* (2013.01); *D06M 2200/00* (2013.01); *D10B 2321/02* (2013.01); *D10B 2321/06* (2013.01); *D10B 2331/14* (2013.01); *D10B 2401/20* (2013.01)

(58) Field of Classification Search
CPC .. C01B 2202/34; C01B 2202/36; D01D 5/08; D01D 5/24; D01D 5/34; D01F 8/06; D01F 8/10; D01F 8/16; D01F 8/18; D06M 11/74; D06M 11/83; D06M 2101/20; D06M 2101/24; D06M 2101/30; D06M 2200/00; B82Y 30/00; D10B 2321/02; D10B 2321/06; D10B 2331/14; D10B 2401/20
USPC ........ 428/373; 977/734, 737, 738, 740, 741, 977/742, 745, 746, 748, 749
See application file for complete search history.

(56) References Cited

FOREIGN PATENT DOCUMENTS

| | | | | |
|---|---|---|---|---|
| CN | 105586662 | 5/2016 | | |
| CN | 108169976 | 6/2018 | | |
| CN | 110205688 | 9/2019 | | |
| CN | 112267174 | 1/2021 | | |
| CN | 113106570 | 7/2021 | | |
| JP | 007104324 | 4/1995 | | |
| KR | 20180077769 | 7/2018 | | |
| WO | WO-2008057615 A2 * | 5/2008 | ............. | H10K 10/82 |

* cited by examiner

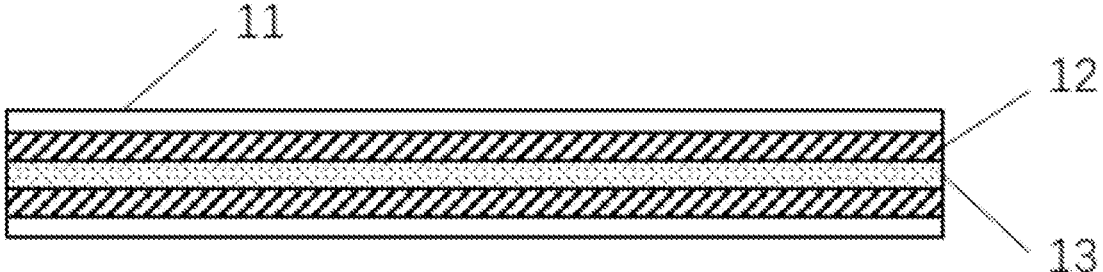

COMPOSITE ELECTROCHROMIC MATERIAL, AND PREPARATION METHOD THEREFOR AND APPLICATION THEREOF

CROSS-REFERENCE TO RELATED APPLICATION

This application is U.S. national phase under 35 U.S.C. § 371 of International Patent Application No. PCT/CN2022/080835, filed on Mar. 15, 2022, which claims priority to Chinese Application No. 202110279348.9, filed on Mar. 16, 2021, the contents of all of which are incorporated by reference in their entirety.

TECHNICAL FIELD OF THE INVENTION

The present disclosure belongs to the field of textile materials, flexible electronic materials and electrochromic materials, and in particular relates to intelligent textile materials, and particularly to a composite electrochromic material, and a preparation method therefor and an application thereof.

BACKGROUND OF THE INVENTION

As the continuous development of intelligent textile materials, people's demands for comfort and functionality of intelligent textiles are also increasing. Electrochromic materials can undergo stable and reversible color changes under the action of an applied electric field, and they have good applications in electrochromic devices, such as giving textile materials the function of color change and forming different color patterns according to needs. However, some existing materials with electrochromic function have more or less the following defects in textile processing or actual wearing process: 1. The electrochromic function is not durable, with repeated processing or wearing, the electrochromic function is constantly missing; 2. Electrochromic materials are easy to be damaged and are not resistant to fatigue; 3. The flexibility of electrochromic materials is poor; 4. With the increase of deformation, the electrochromic function fails; etc.

For example, a color-changing and transformable intelligent textile containing gallium sesquioxide mesoporous film and a preparation method thereof have been disclosed in a literature. This intelligent textile is given a color-changing function through continuous dipping and coating, combined with heat treatment to obtain gallium sesquioxide mesoporous film. However, for this literature, on the one hand, the preparation method has harsh conditions and high energy consumption; on the other hand, the resulting textiles are not wear-resistant and durable, and the formed films are easily lost.

Another literature discloses an electrochromic fiber and a preparation method therefor and an application thereof. The preparation steps include: (1) dissolving a viologen electrochromic material and ferrocene in propylene carbonate (PC), then adding 1-butyl-3-methylimidazolium tetrafluoroborate (BMIBF$_4$) and polyvinylidene fluoride (PVDF), and stirring well to give an electrochromic electrolyte solution; (2) coating the surface of the metal wire fiber with the electrochromic electrolyte solution, and heat curing to obtain a fiber coated with an electrochromic electrolyte layer; (3) coating a protective polymer layer on the outer side of the electrolyte layer and wrapping the outer electrodes parallel to both sides of the fiber coated with the electrolyte layer to obtain the electrochromic fiber. Although this electrochromic material can achieve better electrochromic function, it is not flexible enough to obtain excellent bending and deformation function of textile due to the presence of the metal wire fiber, and when this electrochromic fiber undergoes large deformation, there is a potential peeling of the electrochromic electrolyte layer coated thereon.

SUMMARY OF THE INVENTION

The technical problem to be solved by the present disclosure is to overcome the deficiencies of the prior art, and provide an improved composite electrochromic material, which has excellent deformation ability, stable and sensitive color changing function, and a controllable deformation degree, and has a stable color changing function even in the case of severe deformation, and good fatigue resistance, solving the technical problems that exist in the prior art of difficulty in balancing various performance.

The present disclosure also provides a method for preparing the above-mentioned composite electrochromic material.

The present disclosure also provides an application of the above-mentioned composite electrochromic material in textiles, especially in intelligent textiles.

To solve the above technical problems, a technical solution employed by the present disclosure is as follows:

A composite electrochromic material, comprises a core layer, a skin layer coating on the core layer and having an electrochromic function, and a light-transmitting protective layer formed by a flexible polymer material and coating on the skin layer, the core layer comprises a conductive mixture fluid, and the fluid comprises liquid metal and carboxylated carbon nanotubes, a mass ratio of the carboxylated carbon nanotubes to the liquid metal is (2-5):100, and the carboxylated carbon nanotubes have a length of 15-30 μm, an inner diameter of 6-10 nm, and an outer diameter of 12-20 nm.

According to some preferred and specific aspects of the present disclosure, the carboxylated carbon nanotubes are carboxylated multi-walled carbon nanotubes. In the present disclosure, the carboxylated multi-walled carbon nanotubes can have a stable dispersion in the material, bind well in a certain position and will not tend to agglomerate with flow. The length and the inner and outer diameters of the carboxylated carbon nanotubes of the present disclosure must not be too long or too short, the longer ones affect the bending performance, and the shorter ones cannot guarantee the color change function under severe deformation.

In some preferred implementations of the present disclosure, the carboxylated multi-walled carbon nanotubes are prepared by the following method: adding multi-walled carbon nanotubes to a mixture of concentrated sulfuric acid and concentrated nitric acid in a volume ratio of 5:(1.5-2.5), with a feeding mass ratio of the multi-walled carbon nanotubes to the mixture of 1:(38-42), stirring at 55-65° C. to react, cooling, filtering, washing until neutral, and drying.

According to some preferred aspects of the present disclosure, the liquid metal is GALINSTAN liquid metal (a fluid mixture comprising gallium, indium and tin, a near-eutectic gallium-indium-tin alloy), with a melting point of ≤16° C. and a viscosity of 0.0014-0.0023 Pa*s at 20° C.

According to a specific aspect of the present disclosure, the GALINSTAN liquid metal has a mass ratio of gallium, indium and tin of 68.5:21.5:10, an electrical conductivity of (2.96-3.15)×10$^{-6}$ S/m at 20° C., and a surface tension of 0.703-0.732 N/m.

According to a specific aspect of the present disclosure, the GALINSTAN liquid metal has a mass ratio of gallium, indium and tin of 63.5:24:12.5, an electrical conductivity of $(2.584\text{-}2.875)\times10^{-6}$ S/m at 20° C., and a surface tension of 0.604-0.639 N/m.

According to the present disclosure, the melting point is measured by a melting point meter, the viscosity is measured by an NDJ-5S rotary viscometer with a digital display, the conductivity is measured by a Q45CT conductivity analyzer, and the surface tension is measured by a Sigma 700/701 automatic surface tension meter.

According to some preferred and specific aspects of the present disclosure, the protective layer has an outer diameter of 0.8-1.1 mm and a thickness of 0.2-0.4 mm.

According to some preferred and specific aspects of the present disclosure, the skin layer has an outer diameter of 0.5-0.7 mm and a thickness of 0.2-0.3 mm.

According to some preferred and specific aspects of the present disclosure, the core layer has a diameter of 0.3-0.5 mm.

According to some preferred aspects of the present disclosure, the skin layer has an optical contrast percentage of 40-60% and a color brightness during stretching of 0.80-0.95.

According to the present disclosure, the optical contrast percentage is measured by an optical contrast measurement method according to HG/T 4951-2016, and the color brightness during stretching is measured by a visual colorimetry according to GB/T6749-1997.

According to some specific aspects of the present disclosure, the raw material of the skin layer is an organic electrochromic material or an inorganic electrochromic material.

According to some specific and preferred aspects of the present disclosure, the skin layer consists of polyvinyl alcohol and an organic electrochromic material and/or an inorganic electrochromic material, with a mass ratio of the polyvinyl alcohol to the organic electrochromic material and/or the inorganic electrochromic material of (0.5-1):1. Specifically, the skin layer consists of polyvinyl alcohol and an organic electrochromic material with a mass ratio of (0.5-1):1, or the skin layer consists of polyvinyl alcohol and an inorganic electrochromic material with a mass ratio of (0.5-1):1, or the skin layer consists of polyvinyl alcohol, an organic electrochromic material and an inorganic electrochromic material, wherein a mass ratio of the amount of the polyvinyl alcohol and the total amount of the organic electrochromic material and the inorganic electrochromic material is (0.5-1):1.

According to some preferred aspects of the present disclosure, the polyvinyl alcohol has a weight-average molecular weight of 72,600-81,400.

According to some preferred aspects of the present disclosure, the organic electrochromic material and/or the inorganic electrochromic material may be polyaniline with a weight-average molecular weight of 55,000-60,000.

According to the present disclosure, the color change of the skin layer with electrochromic function is reversible, and which can be blue, green, etc.

According to some preferred aspects of the present disclosure, the raw material of the protective layer is a polyolefin material with an elastic elongation of 300-500%, an elastic recovery rate of 97-99% and a softening temperature of greater than 200° C. The protective layer of polyolefin material of the present disclosure has excellent flexibility and can give full play to the flexibility of the conductive mixture while playing a protective role, so that the overall material has excellent deformation ability and is suitable for making intelligent textile products.

According to some preferred and specific aspects of the present disclosure, the polyolefin material is a polyolefin elastomer with a melt index (measured by an XNR-400B melt flow rate tester according to GB/T 3682-2000) of 30 g/10 min.

Another technical solution provided by the present disclosure is: a method for preparing the above-mentioned composite electrochromic material, which comprises the following steps:

(1) drying a raw material of the skin layer and a raw material of the light-transmitting protective layer, respectively;

(2) melting the raw material of the skin layer and the raw material of the light-transmitting protective layer dried in step (1) in a screw extruder, and spinning by co-extrusion method using a three-channel nozzle to make a hollow double-layer fiber with a cavity;

(3) injecting the conductive mixture into the cavity of the hollow double-layer fiber to make the composite electrochromic material.

The combination of the skin layer with electrochromic function and the outer protective layer prepared by the present disclosure is prepared by the co-extrusion method using a three-channel nozzle, and the hollow double-layer fiber obtained not only has electrochromic function but also retains the protective layer, and further provides the channel of the core layer. The protective layer has excellent flexibility, and can give full play to the flexibility of the conductive mixture while playing a protective role.

According to some preferred aspects of the present disclosure, in step (1), the raw material of the skin layer consists of polyvinyl alcohol and an organic electrochromic material and/or an inorganic electrochromic material, with a feeding mass ratio of the polyvinyl alcohol to the organic electrochromic material and/or the inorganic electrochromic material of (0.5-1):1, and is stirred well by a mixer, the rotational speed of the mixer is 2000-2500 rpm, and the stirring time is 10-12 hours.

According to a specific and preferred aspect of the present disclosure, in step (2), the three-channel nozzle has the following dimensions: an outer diameter of 1.20 mm and an inner diameter of 0.95 mm for an outer channel, an outer diameter of 0.80 mm and inner diameter of 0.50 mm for a middle channel, and a diameter of 0.30 mm for an inner channel.

According to some preferred aspects of the present disclosure, in step (2), the temperature of melting is 300-350° C.

According to some preferred aspects of the present disclosure, in step (3), injecting is carried out using a syringe, its needle is inserted into the cavity of the hollow double-layer fiber, and two ends of the fiber are heated to shrink and prevent leakage.

According to a specific aspect of the present disclosure, the color of the material of the present disclosure transitions from transparent color to green first with the increase of voltage, and then from green to blue, while the surface color gradually becomes lighter as the material stretches and elongates and the thickness of the skin layer decreases.

Still another technical solution provided by the present disclosure is: an application of the above-mentioned composite electrochromic material in intelligent textiles.

Due to the use of the above technical solutions, the present disclosure has the following advantages over the prior art:

The present disclosure innovatively provides a new structure of composite electrochromic material, the core layer uses a specific conductive mixture with excellent conductive properties and deformability, the conductive mixture uses a combination of liquid metal and carboxylated carbon nanotubes, in which the internal filling of specific size of carboxylated carbon nanotubes can play the role of supporting material to prevent the phenomenon of liquid metal breakage in the process of stretching excessively or bending and folding during the deformation of the material, but will not affect the overall flexibility of the material, while the specific core layer of this application is combined with the skin layer with electrochromic function, further improves the sensitivity of the overall material, which is able to produce reversible color change, with stable color change, good fatigue resistance, and not easy to break.

BRIEF DESCRIPTION OF THE DRAWINGS

FIG. 1 is a schematic diagram of the cross-sectional structure of the composite electrochromic material in an embodiment of the present disclosure;

Wherein, 11, protective layer; 12, skin layer; 13, core layer.

DETAILED DESCRIPTION OF EXEMPLARY EMBODIMENTS

In the following, the specific embodiments are combined to further explain the above solutions in detail; it should be understood that, those embodiments are to explain the basic principle, major features and advantages of the present disclosure, and the present disclosure is not limited by the scope of the following embodiments; the implementation conditions used in the embodiments may be further adjusted according to particular requirements, and undefined implementation conditions usually are conditions in conventional experiments.

In the following, unless otherwise specified, all raw materials are basically commercially available or prepared by conventional methods in the field. Polyaniline was purchased from Guangdong Wengjiang Chemical Reagent Co., Ltd, CAS No. 25233-30-1, with a weight-average molecular weight of 55,000-60,000; polyvinyl alcohol was purchased from Shanghai Jinshan Petrochemical, CAS No.: 9002-89-5, PVA 088-20 (1788), with a weight-average molecular weight of 72,600-81,400.

In the following embodiments, carboxylated multi-walled carbon nanotubes were prepared by the following steps: adding multi-walled carbon nanotubes (purchased from Shenzhen Turing Evolution Technology Co., Ltd., with a length of 15-30 μm, an inner diameter of 6-10 nm, and an outer diameter of 12-15 nm, CAS No. 308068-56-6) into concentrated sulfuric acid/concentrated nitric acid in a volume ratio of 5:2 (the concentrated sulfuric acid is commercially available sulfuric acid with a mass percentage of 98, the concentrated nitric acid is commercially available nitric acid with a mass percentage of 75) with an adding mass ratio of 1:40, stirring at 60° C. for 15 min to react, cooling, filtering and washing until neutral, and drying at 80° C. for 24 h.

In the following description, the three-channel nozzle used had the following dimensions: an outer diameter of 1.20 mm and an inner diameter of 0.95 mm for the outer channel, an outer diameter of 0.80 mm and inner diameter of 0.50 mm for the middle channel, and a diameter of 0.30 mm for the inner channel.

Embodiment 1

This embodiment provided a composite electrochromic material, as shown in FIG. 1, which was formed by a core layer 11, a skin layer 12 having an electrochromic function, and a light-transmitting protective layer 13 formed by a flexible polymer material that were arranged in sequence from inside to outside, the material of the core layer comprised a conductive mixture with fluidity, and the conductive mixture comprised liquid metal and carboxylated carbon nanotubes, a mass ratio of the carboxylated carbon nanotubes to the liquid metal was 3:100, wherein the liquid metal consisted of gallium, indium and tin in a mass ratio of 68.5:21.5:10.

A composite material obtained by mixing polyaniline and polyvinyl alcohol with a mass ratio of 2:1 was used as the raw material of the skin layer having an electrochromic function.

The raw material of the light-transmitting protective layer formed by a flexible polymer material was polyolefin elastomer purchased from The DowChemical Company (USA), with a melt index of 30 g/10 min.

The method for preparing the composite electrochromic material, which comprised the following steps:

(1) Polyaniline and polyvinyl alcohol were mixed at a mass ratio of 2:1 using a mixer at 2500 rmp for 10 hours, and mixed well and dried for use, and the polyolefin material was dried for use.

(2) The treated polyolefin material and polyaniline/polyvinyl alcohol were put into the screw extruder for high-temperature melt treatment at 350° C., respectively, the spinning solutions after melt treatment were respectively introduced into the middle channel and the outer channel, wherein the polyolefin material was introduced into the outer channel with a flow rate of 0.2 ml/min, polyaniline/polyvinyl alcohol was introduced into the middle channel with a flow rate of 0.8 ml/min, the spinning temperature was 230° C., the three-channel nozzle was used for co-extrusion spinning to form a new hollow double-layer fiber, the new hollow double-layer fiber was shaped in a gel bath, and then dried naturally for 24 hours to produce a hollow double-layer fiber with a cavity.

(3) The components of the conductive mixture were mixed by ultrasonic oscillation according to the ratio, then one end of the dried hollow double-layer fiber was connected to the needle, and the conductive mixture was filled into the cavity of the hollow double-layer fiber by syringe injection to obtain the composite electrochromic material.

This composite electrochromic material has excellent deformation ability, and a color change response speed of 1.7 s [the test method was measuring the time interval from when the material is energized to when a green color is visible to the naked eye after a 12 V of voltage is applied to a length of one meter of material], [the color change response speeds were 2.0 s, 2.7 s and 3.4 s when deforming by 45°, 90° and 135°, respectively];

The color changes to green or blue, and the material is not easy to bend and break with the number of bending fatigue resistance times of $1.9 \times 10^5$ [tested by JWQ06 bending fatigue tester, with a pre-tension of 0.75±0.05 cn/dtex, and a repeated bending angle of 100°], and can be applied to the field of intelligent textiles.

Embodiment 2

This embodiment provided a composite electrochromic material, which was formed by a core layer, a skin layer having an electrochromic function, and a light-transmitting protective layer formed by a flexible polymer material that were arranged in sequence from inside to outside, the material of the core layer comprised a conductive mixture with fluidity, and the conductive mixture comprised liquid metal and carboxylated carbon nanotubes, a mass ratio of the carboxylated carbon nanotubes to the liquid metal was 3:100, wherein the liquid metal consisted of gallium, indium and tin in a mass ratio of 63.5:24:12.5.

A composite material obtained by mixing polyaniline and polyvinyl alcohol with a mass ratio of 1:1 was used as the raw material of the skin layer having an electrochromic function.

The raw material of the light-transmitting protective layer formed by a flexible polymer material was polyolefin elastomer purchased from The DowChemical Company (USA), with a melt index of 30 g/10 min.

The method for preparing the composite electrochromic material, which comprised the following steps:

(1) Polyaniline and polyvinyl alcohol were mixed at a mass ratio of 1:1 using a mixer at 2000 rmp for 10 hours, and mixed well and dried for use, and the polyolefin material was dried for use.

(2) The treated polyolefin material and polyaniline/polyvinyl alcohol were put into the screw extruder for high-temperature melt treatment at 350° C., respectively, the spinning solutions after melt treatment were respectively introduced into the middle channel and the outer channel, wherein the polyolefin material was introduced into the outer channel with a flow rate of 0.3 ml/min, polyaniline/polyvinyl alcohol was introduced into the middle channel with a flow rate of 0.8 ml/min, the spinning temperature was 200° C., the three-channel nozzle was used for co-extrusion spinning to form a new hollow double-layer fiber, the new hollow double-layer fiber was shaped in a gel bath, and then dried naturally for 24 hours to produce a hollow double-layer fiber with a cavity.

(3) The components of the conductive mixture were mixed by ultrasonic oscillation according to the ratio, then one end of the dried hollow double-layer fiber was connected to the needle, and the conductive mixture was filled into the cavity of the hollow double-layer fiber by syringe injection to obtain the composite electrochromic material.

This composite electrochromic material has excellent deformation ability, and a color change response speed of 1.4 s [the test method was measuring the time interval from when the material is energized to when a green color is visible to the naked eye after a 12 V of voltage is applied to a length of one meter of material], [the color change response speeds were 1.5 s, 2.1 s and 2.9 s when deforming by 45°, 90° and 135°, respectively];

The color changes to green or blue, and the material is not easy to bend and break with the number of bending fatigue resistance times of $2.4 \times 10^5$ [tested by JWQ06 bending fatigue tester, with a pre-tension of 0.75±0.05 cn/dtex, and a repeated bending angle of 100°], and can be applied to the field of intelligent textiles.

Embodiment 3

This embodiment provided a composite electrochromic material, which was formed by a core layer, a skin layer having an electrochromic function, and a light-transmitting protective layer formed by a flexible polymer material that were arranged in sequence from inside to outside, the material of the core layer comprised a conductive mixture with fluidity, and the conductive mixture comprised liquid metal and carboxylated carbon nanotubes, a mass ratio of the carboxylated carbon nanotubes to the liquid metal was 5:100, wherein the liquid metal consisted of gallium, indium and tin in a mass ratio of 63.5:24:12.5.

A composite material obtained by mixing polyaniline and polyvinyl alcohol with a mass ratio of 1:1 was used as the raw material of the skin layer having an electrochromic function.

The raw material of the light-transmitting protective layer formed by a flexible polymer material was polyolefin elastomer purchased from The DowChemical Company (USA), with a melt index of 30 g/10 min.

The method for preparing the composite electrochromic material, which comprised the following steps:

(1) Polyaniline and polyvinyl alcohol were mixed at a mass ratio of 1:1 using a mixer at 2500 rmp for 10 hours, and mixed well and dried for use, and the polyolefin material was dried for use.

(2) The treated polyolefin material and polyaniline/polyvinyl alcohol were put into the screw extruder for high-temperature melt treatment at 350° C., respectively, the spinning solutions after melt treatment were respectively introduced into the middle channel and the outer channel, wherein the polyolefin material was introduced into the outer channel with a flow rate of 0.2 ml/min, polyaniline/polyvinyl alcohol was introduced into the middle channel with a flow rate of 0.7 ml/min, the spinning temperature was 200° C., the three-channel nozzle was used for co-extrusion spinning to form a new hollow double-layer fiber, the new hollow double-layer fiber was shaped in a gel bath, and then dried naturally for 24 hours to produce a hollow double-layer fiber with a cavity.

(3) The components of the conductive mixture were mixed by ultrasonic oscillation according to the ratio, then one end of the dried hollow double-layer fiber was connected to the needle, and the conductive mixture was filled into the cavity of the hollow double-layer fiber by syringe injection to obtain the composite electrochromic material.

This composite electrochromic material has excellent deformation ability, and a color change response speed of 1.5 s [the test method was measuring the time interval from when the material is energized to when a green color is visible to the naked eye after a 12 V of voltage is applied to a length of one meter of material], [the color change response speeds were 1.8 s, 2.5 s and 3.1 s when deforming by 45°, 90° and 135°, respectively];

The color changes to green or blue, and the material is not easy to bend and break with the number of bending fatigue resistance times of $2.2 \times 10^5$ [tested by JWQ06 bending fatigue tester, with a pre-tension of 0.75±0.05 cn/dtex, and a repeated bending angle of 100°], and can be applied to the field of intelligent textiles.

Comparative Example 1

It was basically the same as Embodiment 1, except that the conductive mixture was replaced by a separate liquid metal consisting of gallium, indium and tin in a mass ratio of 68.5:21.5:10, without the addition of carboxylated multi-walled carbon nanotubes.

This composite electrochromic material has excellent deformation ability, and a color change response speed of 1.9 s [the test method was measuring the time interval from when the material is energized to when a green color is visible to the naked eye after a 12 V of voltage is applied to a length of one meter of material], [the color change response speeds were 2.8 s, 4.0 s and 5.2 s when deforming by 45°, 90° and 135°, respectively];

The number of bending fatigue resistance times was $1.7 \times 10^5$ [tested by JWQ06 bending fatigue tester, with a pre-tension of $0.75\pm0.05$ cn/dtex, and a repeated bending angle of 100°].

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A composite electrochromic material, wherein, the composite electrochromic material comprises a core layer, a skin layer coating on the core layer and having an electrochromic function, and a light-transmitting protective layer formed by a flexible polymer material and coating on the skin layer, the core layer comprises a conductive mixture fluid, wherein the conductive mixture fluid comprises liquid metal and carboxylated carbon nanotubes.

2. The composite electrochromic material according to claim 1, wherein, a mass ratio of the carboxylated carbon nanotubes to the liquid metal is (2-5): 100.

3. The composite electrochromic material according to claim 1, wherein, the carboxylated carbon nanotubes have a length of 15-30 μm, an inner diameter of 6-10 nm, and an outer diameter of 12-20 nm.

4. The composite electrochromic material according to claim 1, wherein, a mass ratio of the carboxylated carbon nanotubes to the liquid metal is (2-5):100, and the carboxylated carbon nanotubes have a length of 15-30 μm, an inner diameter of 6-10 nm, and an outer diameter of 12-20 nm.

5. The composite electrochromic material according to claim 1, wherein, the carboxylated carbon nanotubes are carboxylated multi-walled carbon nanotubes.

6. The composite electrochromic material according to claim 1, wherein, the liquid metal is a fluid mixture comprising gallium, indium and tin, with a melting point of ≤16° C. and a viscosity of 0.0014-0.0023 Pa*s at 20° C.

7. The composite electrochromic material according to claim 1, wherein, the light-transmitting protective layer has an outer diameter of 0.8-1.1 mm and a thickness of 0.2-0.4 mm.

8. The composite electrochromic material according to claim 1, wherein, the skin layer has an outer diameter of 0.5-0.7 mm and a thickness of 0.2-0.3 mm.

9. The composite electrochromic material according to claim 1, wherein, the core layer has a diameter of 0.3-0.5 mm.

10. The composite electrochromic material according to claim 1, wherein, the skin layer has an optical contrast percentage of 40-60% and a color brightness during stretching of 0.80-0.95; the optical contrast percentage is measured by an optical contrast measurement method according to HG/T 4951-2016, and the color brightness during stretching is measured by a visual colorimetry according to GB/T6749-1997.

11. The composite electrochromic material according to claim 1, wherein, the skin layer is an organic electrochromic material or an inorganic electrochromic material.

12. The composite electrochromic material according to claim 1, wherein, the skin layer consists of polyvinyl alcohol and an organic electrochromic material and/or an inorganic electrochromic material, with a mass ratio of the polyvinyl alcohol to the organic electrochromic material and/or the inorganic electrochromic material of (0.5-1):1.

13. The composite electrochromic material according to claim 12, wherein, the polyvinyl alcohol has a weight-average molecular weight of 72,600-81,400, and the organic electrochromic material is polyaniline with a weight-average molecular weight of 55,000-60,000.

14. The composite electrochromic material according to claim 1, wherein, the light-transmitting protective layer is a polyolefin material with an elastic elongation of 300-500%, an elastic recovery rate of 97-99% and a softening temperature of greater than 200° C.

15. A method for preparing the composite electrochromic material according to claim 1, wherein, the preparation method comprises the following steps:

(1) drying a raw material of the skin layer, the and a raw material of the light-transmitting protective layer, respectively;

(2) melting the raw material of the skin layer and the raw material of the light-transmitting protective layer dried in step (1) in a screw extruder, and spinning by co-extrusion method using a three-channel nozzle to make a hollow double-layer fiber with a cavity;

(3) injecting the conductive mixture into the cavity of the hollow double-layer fiber to make the composite electrochromic material.

16. The method for preparing the composite electrochromic material according to claim 15, wherein, in step (2), the temperature of melting is 300-350° C.; in step (3), injecting is carried out using a syringe, a needle of the syringe is inserted into the cavity of the hollow double-layer fiber, and two ends of the fiber are heated to shrink and prevent leakage.

17. An intelligent textile, wherein, the intelligent textile comprises the composite electrochromic material according to claim 1.

* * * * *